(12) United States Patent
Walther et al.

(45) Date of Patent: Oct. 2, 2018
(10) Patent No.: US 10,087,811 B2

(54) VEHICLE EXHAUST ISOLATOR

(71) Applicant: FORD MOTOR COMPANY, Dearborn, MI (US)

(72) Inventors: Nicholas Jon Walther, Lake Orion, MI (US); Erich James Nowka, Ann Arbor, MI (US); Kerry Timothy Havener, Canton, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 0 days.

(21) Appl. No.: 15/394,213

(22) Filed: Dec. 29, 2016

(65) Prior Publication Data

US 2018/0187589 A1     Jul. 5, 2018

(51) Int. Cl.
    *F16M 13/02*     (2006.01)
    *F01N 13/18*     (2010.01)
    *B60K 13/04*     (2006.01)

(52) U.S. Cl.
    CPC .......... *F01N 13/1822* (2013.01); *B60K 13/04* (2013.01)

(58) Field of Classification Search
USPC ........ 248/686, 560, 634, 610, 612; 180/309; 165/185
See application file for complete search history.

(56) References Cited

U.S. PATENT DOCUMENTS

| | | | |
|---|---|---|---|
| 3,960,232 A | 6/1976 | Hubbell, III | |
| 4,159,043 A * | 6/1979 | James | B60K 5/04 180/296 |
| 4,844,401 A * | 7/1989 | Tenniswood | B60R 16/005 248/635 |
| 5,197,698 A * | 3/1993 | Bartholomew | B60K 13/04 180/309 |
| 5,310,158 A | 5/1994 | Cassel | |
| 5,507,463 A * | 4/1996 | Kobylinski | B60K 13/04 248/610 |
| 5,957,415 A * | 9/1999 | Perea | F16L 3/20 248/58 |
| 6,402,119 B1 * | 6/2002 | Miska | B60K 13/04 248/58 |
| 6,572,070 B2 * | 6/2003 | Arciero | B60K 13/04 248/60 |
| 6,758,300 B2 | 7/2004 | Kromis et al. | |
| 6,851,506 B2 * | 2/2005 | Bovio | B60K 13/04 180/296 |
| 7,165,645 B2 * | 1/2007 | Chae | F01N 13/1822 180/309 |
| 7,753,166 B2 | 7/2010 | Brockman et al. | |
| 8,256,737 B2 | 9/2012 | Stango | |

(Continued)

FOREIGN PATENT DOCUMENTS

KR     0135500     3/1999

*Primary Examiner* — Terrell L McKinnon
*Assistant Examiner* — Michael McDuffie
(74) *Attorney, Agent, or Firm* — Marla Johnston; Brooks Kushman P.C.

(57) ABSTRACT

An isolator is disclosed for attaching an exhaust system to a frame pin on a vehicle frame. The isolator includes a vibration damping body that defines a frame pin receiving opening and an exhaust pin receiving opening. A tab is provided on an upper end of the vibration damping body that is manually engaged to bend the upper end of the body away from and toward the frame pin to facilitate inserting the frame pin in the frame pin receiving opening.

11 Claims, 3 Drawing Sheets

(56) References Cited

U.S. PATENT DOCUMENTS

| | | | |
|---|---|---|---|
| 8,376,331 B2* | 2/2013 | Rodecker | F01N 13/1811 |
| | | | 180/296 |
| 2003/0173489 A1* | 9/2003 | Kakimoto | F01N 13/1822 |
| | | | 248/610 |
| 2007/0063401 A1* | 3/2007 | Rodecker | A61M 35/003 |
| | | | 267/292 |
| 2007/0172167 A1 | 7/2007 | Lew | |
| 2009/0230279 A1 | 9/2009 | Stango | |
| 2010/0140441 A1* | 6/2010 | Chervin | B29C 47/0028 |
| | | | 248/610 |
| 2012/0181411 A1* | 7/2012 | Rodecker | F01N 13/1805 |
| | | | 248/634 |
| 2012/0181412 A1* | 7/2012 | Rodecker | F01N 13/1805 |
| | | | 248/634 |
| 2012/0312954 A1* | 12/2012 | Rodecker | F01N 13/1822 |
| | | | 248/617 |
| 2015/0300234 A1* | 10/2015 | Hirukawa | F01N 13/1805 |
| | | | 180/309 |
| 2016/0069247 A1 | 3/2016 | Rodecker | |

* cited by examiner

VEHICLE EXHAUST ISOLATOR

TECHNICAL FIELD

This disclosure relates to isolators used to reduce noise and vibration from vehicle exhaust systems.

BACKGROUND

Vehicle exhaust systems are installed in assembly plants with the partially assembled chassis and body at an overhead assembly station having access to the underbody area. Isolators made of elastomeric, or rubber-like, material are assembled between the frame and exhaust system to reduce noise and vibrations that may otherwise be transmitted to the vehicle body. Isolators may be furnished to the line as a part-in-assembly with the exhaust system. Limited space is available in the locations where the isolators are assembled to a frame pin on the vehicle frame to assemble the exhaust system to the frame.

The isolator may be preinstalled on an exhaust hanger pin that is received in a lower hole defined by the isolator. The isolator is bent away from the frame to clear the end of the frame pin that is then pushed into an upper hole defined by the isolator to complete the installation of the isolator.

Considerable assembly effort and substantial force is required to bend back the isolator and then push the isolator onto the frame pin for installing the isolator. Current ergonomic standards limit the amount of force required to assemble the isolators to a force of between 8 and 13 pounds.

The exhaust pipe and muffler are below the frame pin and limit the space available to grasp and manipulate the isolator, which further complicates the assembly operation. In some cases, the operation may be a blind assembly operation because the exhaust pipe and muffler obscure the operator's view. The difficulty of the assembly operation increases the risk of partial or incomplete assembly in an area that is obscured from view.

This disclosure is directed to solving the above problems and other problems as summarized below.

SUMMARY

According to one aspect of this disclosure, an isolator is provided for attaching an exhaust system to a frame pin on a vehicle frame. The isolator is a flexible body defining a frame pin receiving opening and an exhaust pin receiving opening. A tab is provided on an upper end of the body that is manually engaged to bend the upper end of the body away from the frame pin to facilitate insertion of the frame pin in the frame pin receiving opening.

According to another aspect of this disclosure, an exhaust assembly is provided for a vehicle having a frame member including a frame pin and an exhaust system including a hanger having a support pin. An isolator is attached between the exhaust system and the frame member and includes a gripping tab that is manually grasped to locate the isolator over the frame pin prior to attaching the isolator to the frame pin. The gripping tab also serves as a pushing surface to facilitate bending the isolator toward and onto the frame pin by decreasing the measured insertion force of the described assembly operation.

According to other aspects of this disclosure, the flexible body may define a central opening that includes a vertical jounce bumper that is provided inside the central opening.

The tab may be imbedded into the upper end of the body. Alternatively, the tab may include a clip on an inner end that is attached to the upper end of the isolator and a cantilevered portion extending outwardly from the upper end by which the tab is manually engaged.

The isolator may further include a saddle bracket including first and second sidewalls disposed on opposite sides of the flexible body and a top wall, or bridging wall, and the clip may be attached to the top wall. The first and second sidewalls may each define an opening and the frame pin may be received in the openings defined by the sidewalls and the frame pin receiving opening.

The isolator may further comprise a hanger attached to an exhaust system component, and the exhaust pin may be part of the hanger.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
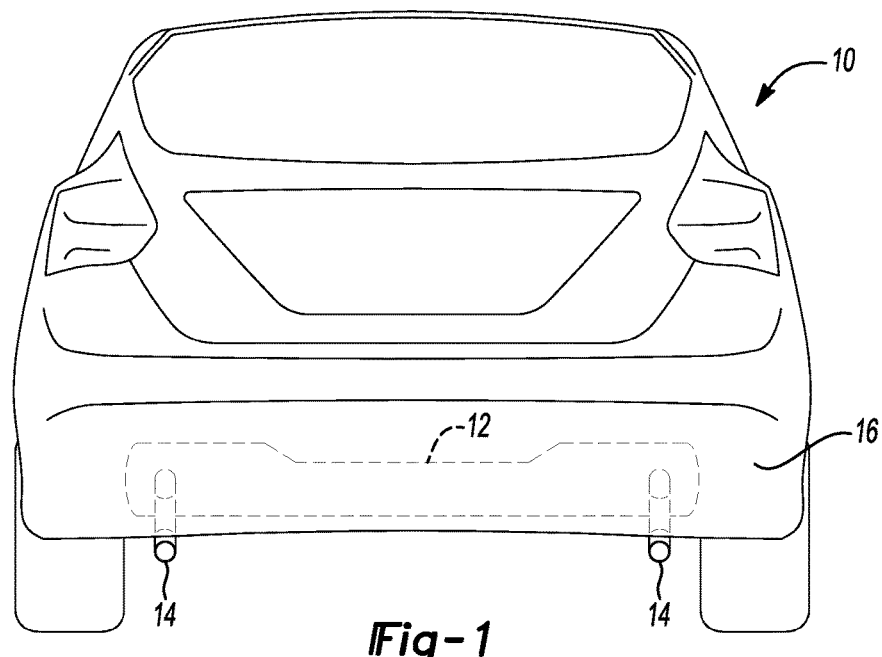
FIG. 1 is a rear elevation view of a vehicle equipped with a transversely oriented muffler.

Referring to FIG. 1, a vehicle 10 is shown with a muffler 12 shown in phantom lines. The muffler 12 ports exhaust gases to tailpipes or exhaust pipes 14. The exhaust pipes 14 are shown below the bumper 16 of the vehicle 10. The muffler 12 in the illustrated embodiment is a transversely mounted muffler 12 but it should be understood that the isolator 18 may also be used to attach a longitudinally oriented muffler to the frame of a vehicle 10. The isolator 18 may also be used to attach any other portions of the exhaust system that require attachment to the vehicle body, frame or other vehicle structure.

Figure 2:
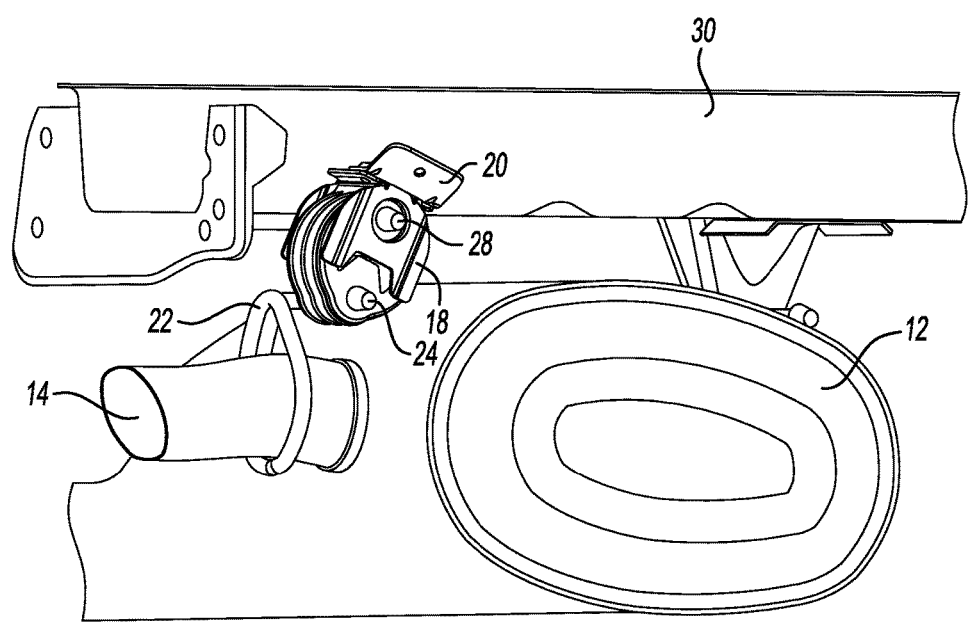
FIG. 2 is a fragmentary perspective view of an exhaust system attached to a vehicle with an isolator made according to one embodiment of this disclosure.

Referring to FIG. 2, an isolator 18 is illustrated that includes a grip tab 20 that may be used to bend the isolator 18 to facilitate installation of the muffler 12 and exhaust pipe 14 as an assembly. The isolator may be provided as a part-in-assembly with the isolator 18 being attached to a hanger 22 that includes an exhaust support pin 24. The hanger 22 may be a metal rod encircling an exhaust pipe 14. The isolator 18 is preferably assembled to the exhaust support pin 24 when the exhaust system, including the muffler 12 and exhaust pipe 14, are delivered to the assembly line. The exhaust system of a vehicle 10 is generally installed from beneath the vehicle. Assembly workers install the isolator 18 onto a frame pin 28 that is located overhead. The frame pin 28 is attached to a vehicle frame member 30 such as a longitudinally extending frame rail or a transversely extending beam. Access to the isolator 18 is limited by the muffler 12 and tailpipe 14 due to the fact that the muffler 12 and tailpipe 14 hang below the isolator 18.

Figure 3:
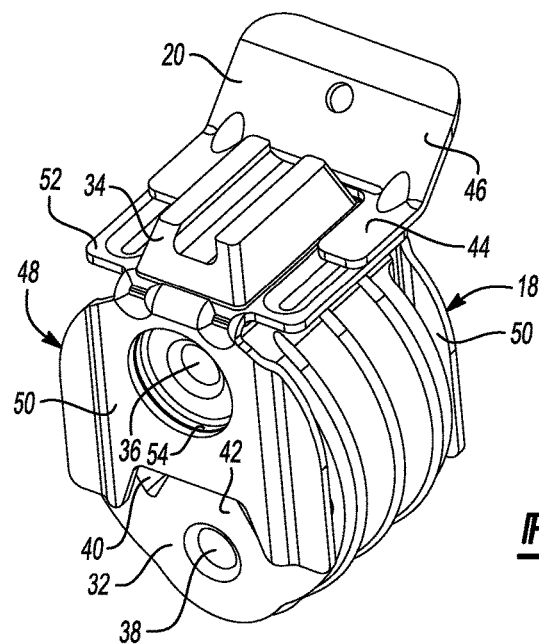
FIG. 3 is a perspective view of an isolator made according to one embodiment of this disclosure.
Figure 4:
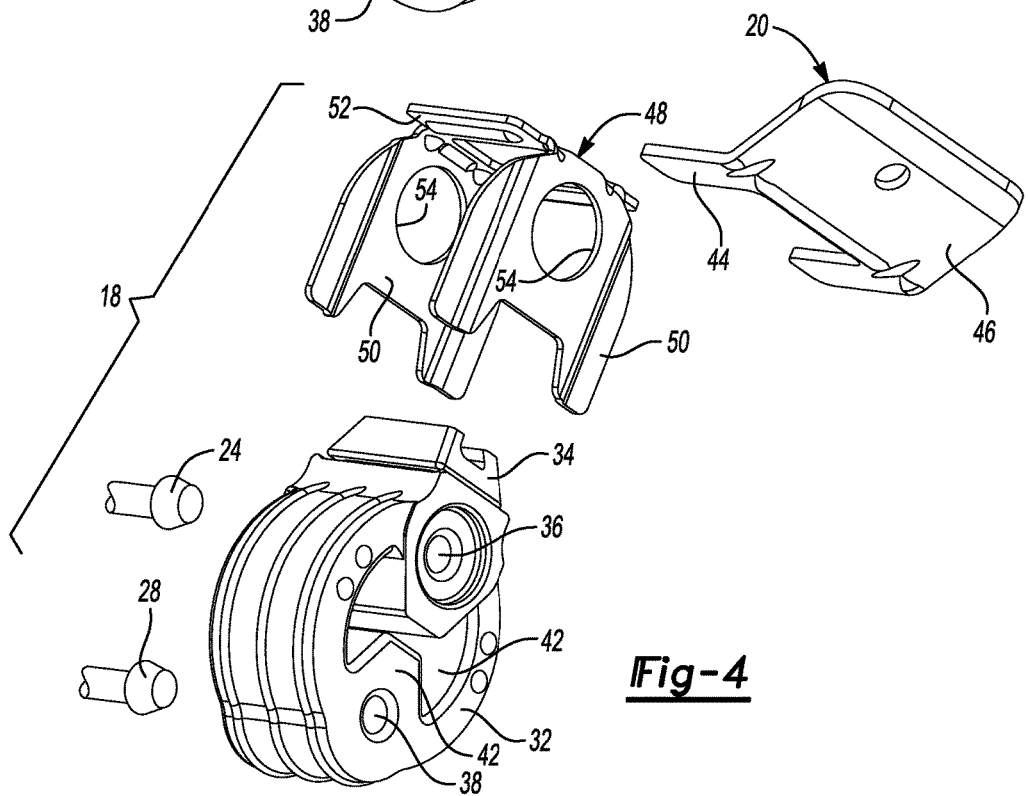
FIG. 4 is an exploded perspective view of an isolator made according to the embodiment of this disclosure shown in FIG. 3.
Figure 5:
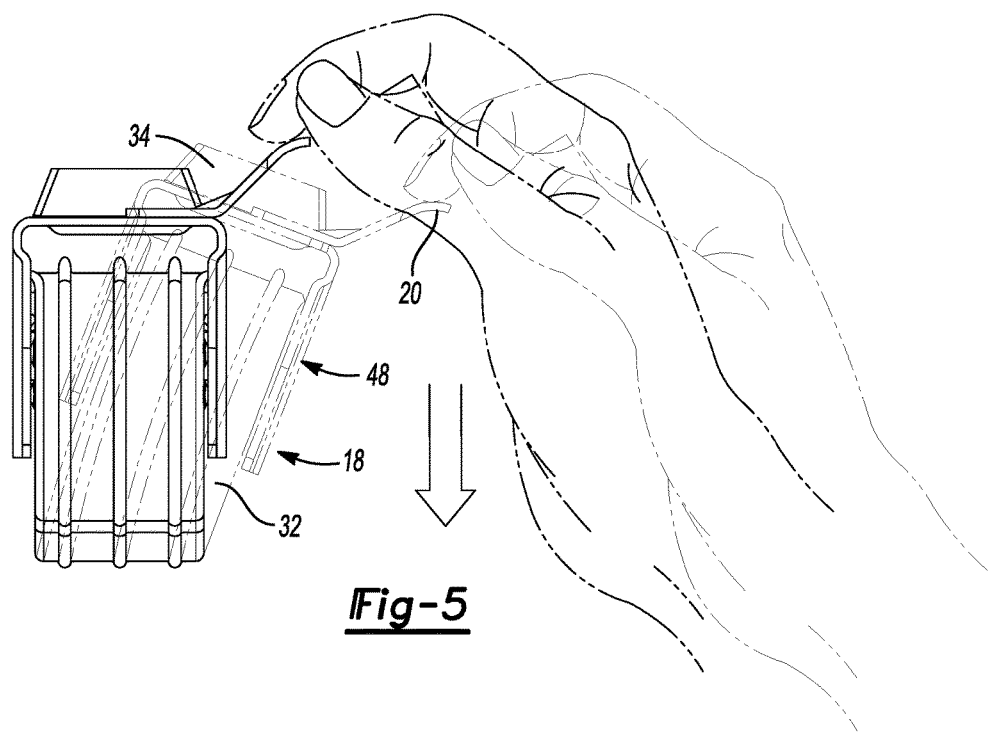
FIG. 5 is front elevation view of an isolator made according to the embodiment of this disclosure shown in FIG. 3 shown with the tab being grasped to bend the isolator.

Referring to FIG. 3-5, the isolator 18 will be described in greater detail. The isolator 18 includes an elastomeric body 32. The elastomeric body may be an elastomer or may be a natural rubber body 32. The body 32 has an upper end 34 and defines a frame pin receiving opening 36 in the upper end 34. An exhaust pin receiving opening 38 is defined by the body 32 below the frame pin receiving opening 36. A central opening 40 is provided between the frame pin receiving opening 36 and the exhaust pin receiving opening 38. A pair of vertical joust bumpers 42 are integrally formed to extend toward each other inside the central opening 40. In a severe vertical displacement of the vehicle 10, the body may be compressed and the joust bumpers may contact each other while the isolator 18 is stretched and compressed in the area of the central opening 40.

The grip tab 20 may include a clip portion 44 and a cantilevered portion 46. The clip portion 44 is adapted to be attached to or clipped to a saddle bracket generally indicated by reference numeral 48. The cantilevered portion 46 extends beyond one side of the body 32 and may be angularly oriented at an angle of about 135° plus or minus 20° to facilitate gripping the grip tab 20 during assembly. The saddle bracket 48 includes a pair of sidewalls 50 that flank opposite sides of the body 32. A bridging wall 52, or top wall, connects the two sidewalls 50 across the upper end 34 of the body 32. The sidewalls 50 define access openings 54. The frame pin 28 is received in the frame pin receiving opening 36 and the access openings 54 when the isolator 18 is installed on the frame pin 28.

Referring specifically to FIG. 5, the isolator 18 is shown being manually manipulated by a person grasping the cantilevered portion 46 of the grip tab 20. The grip tab 20 is assembled to the saddle bracket 48 to bend the body 32 away from the frame pin 28 (shown in FIG. 4). The grip tab 20 is preferably made of metal and may be welded to the saddle bracket 48 that is also a metal component.

Alternatively, the grip tab 20 could be provided as a tool including a handle in place of the cantilevered portion 46 and a clip or fork end that is adopted to selectively engage the saddle bracket 48. The tool can be used to bend the isolator 18 and facilitate installation of the isolator 18 on the frame pin 28.

Figure 6:
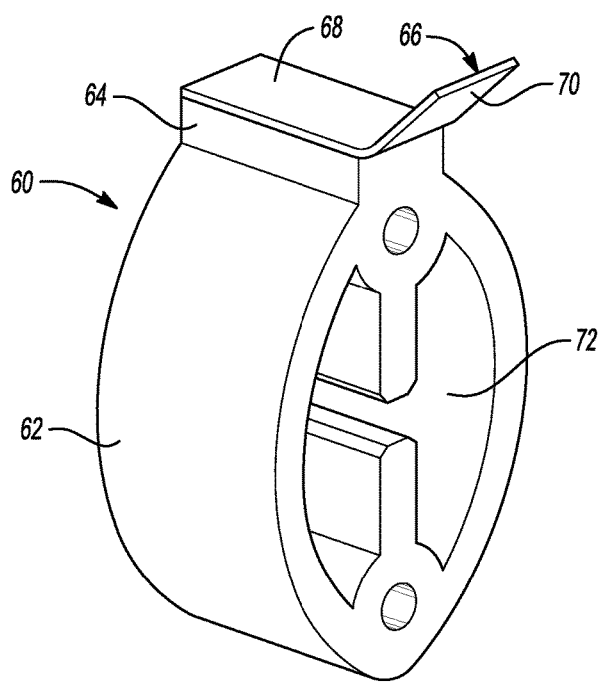
FIG. 6 is a perspective view of an alternative embodiment of an isolator including a gripping tab.

Referring to FIG. 6, an alternative embodiment 60 is illustrated that includes an elastomeric body 62. An end cap 64 is provided on an upper end of the elastomeric body 62. A grip tab 66 is attached to the end cap 64 with an attachment flange 68 being attached to the end cap 64 of the elastomeric body 62. A variety of attachment mechanisms may be used to attach the flange 68 to the end cap 68. For example, the attachment flange 68 may be over-molded into the elastomeric body 62. Alternatively, an adhesive may be used to secure the attachment flange to the end cap 64. In another approach, a slot may be formed on the end cap 64 between the end cap 64 and the other part of the elastomeric body 62 with the attachment flange 68 including an attachment feature adapted to be received in the slot. The elastomeric body 62 is bent when pressure is applied through the end cap 64 when a person manually grasps the gripping flange 70 of the grip tab 66. A person may pull the isolator 60 downwardly to clear the frame pin 68 as described with reference to FIG. 5 above. A central opening 72 defined by the elastomeric body 62 increases the flexibility of the isolator 60 and permits the isolator 60 to be more easily bent by applying pressure to the gripping flange 70.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. An exhaust isolator for a vehicle comprising:
    a dampener body defining a frame pin opening and an exhaust pin opening;
    a cantilevered tab extending from and angled away from an upper end of the body that is manually engaged to bend the upper end of the body away from and toward the frame pin to facilitate insertion of a frame pin that extends from the vehicle in the frame pin opening, wherein the tab includes a clip portion that is attached to the upper end of the isolator and a cantilevered portion extending outwardly from the upper end that is adapted to be manually engaged; and
    a saddle bracket including first and second sidewalls disposed on opposite sides of the body and a top wall, wherein the clip is attached to and sandwiches the top wall between the clip and the dampener body.

2. The isolator of claim 1 wherein the body defines a central opening and further comprising:
    at least one vertical jounce bumper being provided inside the central opening.

3. The isolator of claim 1 wherein the cantilevered tab is imbedded into the upper end of the body.

4. The isolator of claim 1 wherein the body is made of an elastomeric material.

5. The isolator of claim 4 wherein the tab is made of a metal material.

6. The isolator of claim 1 further comprising:
    a hanger attached to an exhaust system component, wherein the exhaust pin is part of the hanger.

7. An exhaust assembly for a vehicle comprising:
    a frame member including a frame pin;
    an exhaust system including a hanger having a support pin;
    an isolator attached between the exhaust system and the frame member;
    a saddle bracket surrounding the isolator;
    a gripping tab including a connected portion that sandwiches the saddle bracket to the isolator and a cantilevered portion extending along an oblique angle from the connected portion;
    an elastomeric body defining a frame pin receiving opening in which the frame pin is receivable and a support pin receiving opening in which the support pin is receivable, wherein the gripping tab is provided on an upper end of the body to bend the upper end of the body away from the frame pin to facilitate insertion of the frame pin in the frame pin receiving opening;
    wherein a portion of the saddle bracket is imbedded into the upper end of the body; and
    wherein the saddle bracket includes first and second sidewalls disposed on opposite sides of the isolator and a bridging wall, wherein the gripping tab includes a clip attachable to the upper end of the isolator; and a cantilevered portion extends outwardly from the upper end to manually grasp the gripping tab, and wherein the clip is attached to the bridging wall.

8. The exhaust assembly of claim 7 wherein the elastomeric body defines a central opening and further comprising:
at least one vertical jounce bumper being provided inside the central opening.

9. The exhaust assembly of claim 7 wherein the first and second sidewalls each define an opening, and wherein the frame pin is received in the openings defined by the sidewalls and the frame pin receiving opening.

10. The exhaust assembly of claim 7 wherein the isolator is made of an elastomeric material.

11. The exhaust assembly of claim 10 wherein the gripping tab is made of a metal material.

* * * * *